US009189792B2

(12) United States Patent
Butler et al.

(10) Patent No.: US 9,189,792 B2
(45) Date of Patent: Nov. 17, 2015

(54) SYSTEM AND METHODS FOR MONITORING DEVICES, SYSTEMS, USERS, AND USER ACTIVITY AT REMOTE LOCATIONS

(75) Inventors: Jon F. Butler, Salt Lake City, UT (US); Mark W. Nakada, Salt Lake City, UT (US)

(73) Assignee: Mediaport Entertainment, Inc., Salt Lake City, UT (US)

( * ) Notice: Subject to any disclaimer, the term of this patent is extended or adjusted under 35 U.S.C. 154(b) by 1111 days.

(21) Appl. No.: 11/773,540

(22) Filed: Jul. 5, 2007

(65) Prior Publication Data
US 2008/0004748 A1 Jan. 3, 2008

Related U.S. Application Data

(63) Continuation-in-part of application No. 11/397,050, filed on Apr. 3, 2006, and a continuation-in-part of application No. 11/397,292, filed on Apr. 4, 2006, which is a continuation-in-part of application No. 11/344,917, filed on Feb. 1, 2006.

(60) Provisional application No. 60/667,638, filed on Apr. 4, 2005, provisional application No. 60/672,428, filed on Apr. 19, 2005, provisional application No. 60/672,427, filed on Apr. 19, 2005.

(51) Int. Cl.
*G06Q 30/02* (2012.01)
*H04L 29/08* (2006.01)
(52) U.S. Cl.
CPC ............. *G06Q 30/02* (2013.01); *H04L 67/22* (2013.01)
(58) Field of Classification Search
CPC .................................................. G06Q 30/0271

USPC ........................................................ 705/14.67
See application file for complete search history.

(56) References Cited

U.S. PATENT DOCUMENTS 4,412,292 A 10/1983 Sedam et al.
4,674,055 A 6/1987 Ogaki et al.
(Continued)

FOREIGN PATENT DOCUMENTS

WO PCT/US07/65930 4/2007

OTHER PUBLICATIONS

U.S. Appl. No. 11/455,458, filed Jun. 19, 2006.

*Primary Examiner* — Jamie Kucab

(57) ABSTRACT

Systems and methods for monitoring remotely located devices, systems, users, and user activities are described. The systems contain a central device where the digital content is stored, a remote device for delivering the digital content to a user, and means for transferring the digital content from the central location to the remote location. Data about the remote devices, users, and the user activities at the remote devices may be monitored. The data includes fault monitoring data, system performance data, system management data, user physical activity data, graphical interface data, demographic data, sales transaction data, survey data, and the like. The data can be monitored on a periodic basis or on a substantial real-time basis. The monitored data can then be used for various purposes, including customizing the advertising and content for an individual user or a group of users, reducing time wasted for diagnostic trips, lessening user frustration, and/or enhancing customer relationship management, as well as facilitating system administration, system maintenance, and/or statistical marketing analyses.

25 Claims, 6 Drawing Sheets

(56) References Cited

U.S. PATENT DOCUMENTS

| | | |
|---|---|---|
| 5,237,157 A | 8/1993 | Kaplan |
| 5,307,354 A | 4/1994 | Cramer et al. |
| 5,445,295 A | 8/1995 | Brown |
| 5,734,719 A | 3/1998 | Tsevdos et al. |
| 5,794,217 A | 8/1998 | Allen |
| 5,848,398 A | 12/1998 | Martin et al. |
| 5,875,110 A | 2/1999 | Jacobs |
| 6,145,102 A | 11/2000 | Klein et al. |
| 6,223,089 B1 | 4/2001 | Page |
| 6,286,029 B1 | 9/2001 | Delph |
| 6,308,887 B1 * | 10/2001 | Korman et al. ............ 235/379 |
| 6,318,536 B1 * | 11/2001 | Korman et al. ............ 194/217 |
| 6,330,490 B1 | 12/2001 | Kim et al. |
| 6,381,575 B1 | 4/2002 | Martin et al. |
| 6,397,189 B1 | 5/2002 | Martin et al. |
| 6,535,791 B1 | 3/2003 | Wang |
| 6,595,342 B1 * | 7/2003 | Maritzen et al. ............ 194/212 |
| 6,651,190 B1 | 11/2003 | Worley et al. |
| 6,654,757 B1 | 11/2003 | Stern |
| 6,655,580 B1 | 12/2003 | Ergo et al. |
| 6,662,080 B2 | 12/2003 | Wakai et al. |
| 6,697,962 B1 | 2/2004 | McCrory et al. |
| 6,711,464 B1 | 3/2004 | Yap et al. |
| 6,748,539 B1 | 6/2004 | Lotspiech |
| 6,757,850 B1 | 6/2004 | Lehner |
| 6,799,165 B1 | 9/2004 | Boesjes |
| 6,813,733 B1 | 11/2004 | Li et al. |
| 6,839,597 B2 | 1/2005 | Hattori et al. |
| 6,895,285 B2 * | 5/2005 | Maity ............................. 700/27 |
| 6,904,458 B1 | 6/2005 | Bishop et al. |
| 7,260,624 B2 | 8/2007 | Sivertsen |
| 7,263,632 B2 | 8/2007 | Ritz |
| 7,356,771 B2 * | 4/2008 | Paul et al. .................... 715/744 |
| 2002/0161476 A1 * | 10/2002 | Panofsky et al. ............ 700/231 |
| 2003/0052165 A1 * | 3/2003 | Dodson ........................ 235/381 |
| 2003/0217306 A1 | 11/2003 | Harthcock |
| 2004/0163008 A1 | 8/2004 | Kim |
| 2005/0097182 A1 | 5/2005 | Bishop |
| 2006/0224517 A1 | 10/2006 | Shimpi |
| 2006/0249576 A1 | 11/2006 | Nakada et al. |
| 2006/0265280 A1 | 11/2006 | Nakada et al. |

\* cited by examiner

* Exemplary steps where a user may receive support from a management component or third party.

SYSTEM AND METHODS FOR MONITORING DEVICES, SYSTEMS, USERS, AND USER ACTIVITY AT REMOTE LOCATIONS

RELATED APPLICATIONS

This application is a continuation-in-part of U.S. application Ser. Nos. 11/397,050, 11/397,292, and 11/344,917, the entire disclosures of which are incorporated herein by reference.

FIELD

This application relates generally to systems and methods for monitoring data. In particular, this application relates to systems and methods for monitoring devices, systems, users, and user activity at remote locations such as kiosks.

BACKGROUND

Many types of information and content are now stored digitally, including books, music, movies, software programs, video games, databases, advertisements, as well as other content. Because such content is stored digitally, it can be easily transferred using many types of electronic networks. See, for example, U.S. Pat. Nos. 5,875,110, 4,412,292, 5,848,398, 6,397,189, 6,381,575, 4,674,055, 5,445,295, 5,734,719, 6,286,029, 6,799,165, 6,655,580, 6,330,490, 6,662,080, 6,535,791, 6,711,464, 5,237,157, 6,654,757, 5,794,217, and 6,748,539. Both private and public electronic networks, including the Internet, are frequently used to transfer the digital content.

Often the digital content is transferred electronically, it can be sold to an user who is not located where the digital content was originally stored. The digital content can be sold for a variety of purposes, including education, entertainment, research, or other purposes. The digital content may be sold in any number of technological formats known in the art that permit storage and retrieval of the digital data, including floppy discs, compact discs of several varieties, video discs of several varieties, including digital video discs, magnetic storage devices using a variety of forms and technologies, and solid state devices of several varieties.

Most of the digital content sales have been to users of computers that are connected to each other via networks of various types, e.g., the Internet. But users are not always located at such a computer when they desire to purchase the digital content, or they have a computer but it is not connected to a network. Consequently, sales of digital content have begun using devices in remote locations, including stand-alone devices (such as kiosks) in retail or other high-traffic areas. The remote devices may be attended or unattended. In both of these instances, the owners and operators need to keep such remote devices (and systems) running virtually all of the time and keep them optimized to facilitate user interaction. For this reason, it has become common practice to monitor the remote device and the user's interaction with the remote device.

However, physically monitoring such remote devices—and the systems containing such remote devices—can be costly, difficult, and inefficient. As the number of remote devices and their geographical locations expand, the time and money spent in traveling to such devices increases and can result in increased communication barriers. Consequently, lost opportunity costs and the number of unsatisfied users can also increase. Accordingly, the industry has begun electronically monitoring such remote devices. See, for example, U.S. Pat. Nos. 5,307,354, 6,145,102, 6,223,089, 6,651,190, 6,697,962, 6,757,850, 6,813,733, 6,839,597, 6,895,285, 6,904,458, Re30,037, as well as U.S. Published Patent Application Nos. 2003/0217306, 2003/0229406, 2004/0059782, 2004/0163008, 2004/0225381, and 2005/0097182.

Nevertheless, the ability to electronically monitor remote devices has been limited for several reasons. First, the monitored data is often limited to a small range of information, primarily system diagnostic data (i.e., system operability status) and cryptic messages (i.e., error codes for indicating status), as well as being limited to only certain components of the system can be monitored. Second, the monitored information is frequently restricted to data that the user actually enters into the remote device, and does not include any other data (including that related to the user's non-entered physical actions during the interaction with device). Third, remote devices are often limited in the content they provide (or only have static content), inherently limiting the information about the user and/or the user's activities that can be monitored. And finally, the means for monitoring often depend on the monitored remote device for power and communication, so the monitoring means become disabled when the monitored remote device experiences technical difficulties.

SUMMARY

Systems and methods for monitoring remote devices, its users, and the user activities are described. The systems contain a central device where the digital content is stored, a remote device for delivering the digital content to a user, and means for transferring the digital content from the central location to the remote location. Data about the remote devices, users, and the user activities at the remote devices may be monitored. The data includes fault monitoring data, system performance data, system management data, user physical activity data, graphical interface data, demographic data, sales transaction data, survey data, and the like. The data can be monitored on a periodic basis or on a substantial real-time basis. The monitored data can then be used for various purposes, including customizing the advertising and content for an individual user or a group of users, reducing time wasted for diagnostic trips, lessening user frustration, and/or enhancing customer relationship management, as well as facilitating system administration, system maintenance, and/or statistical marketing analyses.

DESCRIPTION OF THE DRAWINGS

The following description can be better understood in light of the Figures, in which.

Together with the following description, the Figures demonstrate and explain the principles of the systems and methods for monitoring remote devices, users, and user activities at the devices. In the Figures, the thickness and configuration

DETAILED DESCRIPTION

The following description provides specific details in order to provide a thorough understanding. Nevertheless, the skilled artisan would understand that the systems and methods can be practiced without employing these specific details. Indeed, the systems and methods can be practiced by modifying the illustrated systems and methods and can be used in conjunction with apparatus and techniques conventionally used in the industry. While the invention is described for use with a kiosk as a remote device, it could be used with any remote device, including many types of wireless computing devices, media vending machines, consumer electronic devices, military devices, and the like.

The systems can deliver digital content (or "content") from a first location to one or more second locations that are typically remote from the first location. Accordingly, the systems contain a first device in a first location where the digital content is stored, a second device in a second location that delivers the content to a user (the remote device), and means for transferring the digital content from the first location to the second location. The systems can also collect data from the device(s) in the second location(s) and monitor and receive reports on that data at the device in the first location or even devices in locations outside the system.

Figure 1:
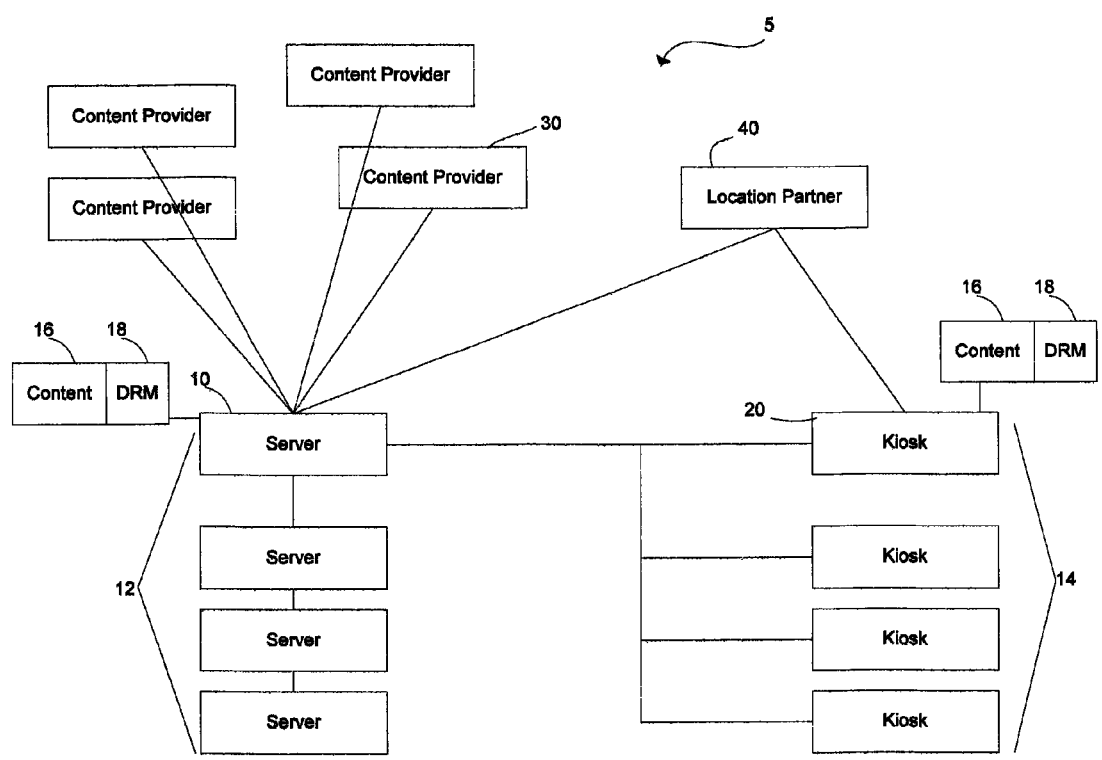
FIG. 1 depicts an exemplary distributed networking system for delivering digital content.

In some aspects, FIG. 1 illustrates the systems for delivering the content. As that Figure depicts, the system 5 contains a first device (i.e., server 10) located in a first location. The first location can be located anywhere desired by the operator, i.e., in a central location (with central not referring to the geographic location). The first device acts as a repository for the digital content. Any device that can operate as a repository can function as the first device.

One example of the first device comprises a server 10. Any type of server known in the art can be used as a server 10. Examples of servers that can be used include a computer running a UNIX or LINUX-style operating system, a computer running a Microsoft Windows operating system, or a personal computer workstation. The server 10 may comprise any storage component on which the digital content can be stored. Examples of storage components include optical storage discs, DVD-RAM discs, and traditional magnetic hard disc drives.

In some aspects, multiple servers 12 may be connected together to make a server cluster. Using a server cluster permits sharing information regarding the content stored on each server 10 and each transaction the server 10 has recorded. By using a server cluster, the system 5 may always be operational, regardless of the operation state of a particular component on the network that connects the components (such as the internet). The server cluster can contain a primary cluster, which handles all critical tasks, with minor functions being routed to a secondary cluster. With this configuration, if the primary cluster is not operational, most functions can be handled by the secondary cluster. A server cluster also allows a large-scale deployment and interoperability, as well as allowing data to be stored on the network in multiple points of co-location.

The software components required for operating the server 10 may be included on a single server or on multiple servers, with each server implementing one or more tasks and communicating among themselves using standard networking protocols. Examples of the server-focused tasks using the software components that may be implemented on one or more servers 10 include those of e-mail server; web server; file server; purchase transaction authentication server; content security server; advertising message server; system/device monitoring server and the like.

As FIG. 1 shows, the server 10 contains digital content 16 (or content 16). The types of content 16 that can be delivered are virtually unlimited. Examples of the digital content include music, movies, video games, software, mobile phone ring tones or true tones, readable and audio e-books, advertising, and other types of content. The format in which the content may be stored is also virtually unlimited. Examples of the types of digital formats include pdf, doc, xls, jpeg, tiff, gif, xbm, pnm, mpeg2, mpeg4, mp3, wma, wmv, mov, wav, and avi, as well as combinations thereof.

The content 16 may be provided internally (by the entity that controls or operates the server 10), or externally by one or more third parties that are the copyright owners of the content or that act on behalf of the owners of the content (collectively, "content providers" 30). Some examples of content providers 30 include music publishers, recording companies, book publishers, artists, performers, users, mobile telephone companies, video game manufacturers, and advertisers. Content providers 30 may provide the content 16 to the server using any known mechanism, including via network connections known in the art, uploading or via other methods, such as providing a CD or DVD to the operator of a server 10.

The digital content 16 can include instructions indicating how the content may be used, distributed, sold, transmitted, or otherwise processed ("use instructions"). The server 10 and/or the remote device can convert such use instructions into digital rights management ("DRM") information 18 that can be associated with any desired content. The DRM information may include any number or combination of restrictions, including those that are enabled by DRM technology and that are selected by a content provider 30. Examples of DRM restrictions include a restriction that visual or textual content not be printed in hardcopy; a restriction that copy-and-paste functions are disabled for textual content; a restriction that a music file may not be played after a certain date; a restriction that a music file or video file may only be played a fixed number of times; and a restriction that a file may only be copied to another device a fixed number of times.

The DRM information may be provided by a third party (such as a location partner 40, content provider 30, system administrator, and any other party designated by a content provider 30) or by the operator of a server 10. In some instances, they may assign a unique transactional ID to each piece of content 16. This unique transactional ID correlates to a set of use instructions and DRM specifications to control how the associated content is managed on devices, such as on the server 10, as further described hereinafter.

The content 16 may also contain detadata that correspond to information about any desired content, such as a genre of music or movie, an artist, a content provider, or otherwise. The metadata may be provided by a content provider 30 or created by the operator of a server 10. The metadata (including metatags) may indicate the use instructions for all of the content that is provided, with distinct use instructions for each piece of content, or with use instructions based on parameters that can be used to classify content. In one example of use instructions, a content provider 30 may indicate that music performed by musical artist A may be redistributed freely, without restriction, music performed by musical artist B may be redistributed freely when purchased at a set price, and music performed by musical artist C may be redistributed in a manner that permits the music to be copied to another computer three times, after which the music may not be copied to another computer, but only played (performed) on a computer where it is stored.

The content 16 may optionally be encrypted in any known manner to increase security of the content during storage on a server 10 or on a remote device, during transfer between a content provider 30 and a server 10, or during transfer between a server 10 and the remote device. Any number of encryption methods known to those in the art may be used to implement this feature. Examples of such encryptions may include both symmetrical and asymmetrical encryption using a variety of methods, including RSA, DES, Triple DES, Blowfish, ElGamal, RC4, and others.

A location partner 40 can optionally be used in the system 5 as depicted in FIG. 1. The location partner 40 comprises an individual or entity that provides a space where the second device may be physically located. Examples of such location partners include owners or managers of airports, bars, clubs, schools, gyms, stadiums, arenas, amusement parks, military bases, retail centers or shops, and eating establishments.

A location partner 40 may provide this space without charge, as a service to individuals that visit the space where the second device is placed. Or the location partner 40 may provide this space in exchange for a fee of some type, in exchange for advertising time on the second device, or in exchange for other benefits. In some aspects, the location partner 40 may control or limit the content that is available via the second device. In other embodiments, the location partner can also control the advertising.

As described above, the system also contains a second device that can be located in a second location that is optionally remote from the first location. The second device receives the content from the first device and then distributes that content to a user. Any device operating in this manner can be used as the second device. In some aspects, the second device comprises a kiosk.

The kiosk provides a point-of-sale experience for any user, including both actual and merely potential purchasers of the content and viewers of any advertisements. In some embodiments, the kiosk may physically display any known advertising, such as posters, banners, or adhesive advertisements. The kiosk may be used in conjunction with products as a point-of-purchase display. Any person can become a user by interacting with the kiosk, whether purchasing content or merely viewing the kiosk and/or any associated advertising. The kiosk used in the system can be any kiosk known in the art, including the kiosk 20 as depicted in FIGS. 1 and 2.

The kiosk 20 can contain any combination of number of video displays. In some aspects, the kiosk 20 contains two video displays, a first video display that may display advertising messages and a second video display that may display menus, samples of content, and related information appropriate to affect a purchase by a user of the content made available through the kiosk 20.

Figure 2:
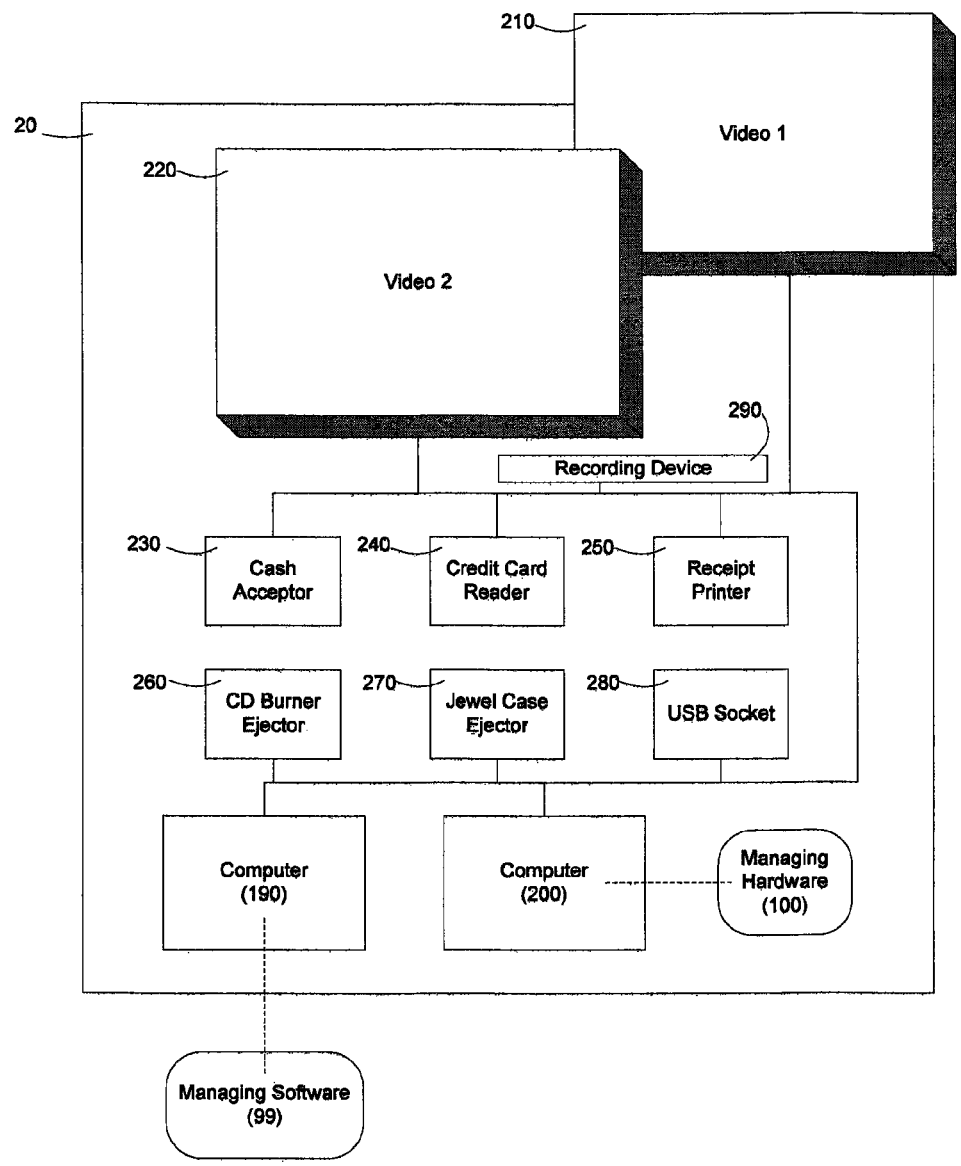
FIG. 2 illustrates some components in a remote device that can be used in delivering digital content to a user.

The kiosk 20 can also contain multiple input and output devices, a few examples of which are shown in FIG. 2, appropriate to interact with a user, display or perform the content stored on the kiosk 20, and complete a sales transaction related to the content. These input and output devices may include, for example, one or more of any of the following: a keyboard; a mouse; a trackball; a joystick; a touch screen; a LED display; a LCD display; a label maker; an automatic coupon feeder; a barcode scanner; an image scanner; biometric scanning devices, such as a fingerprint scanner, a voice-print verifier, a hand geometry recognition device, a retinal/iris scanner, a signature verifier, or a facial recognition device; a Compact Disc reader; a Compact Disc writer (206); a video disk reader; a video disk writer; media device connectivity; including a USB port (208), an IEEE-1394 FireWire port, a SecureDigital (SD) port, a Compactflash port, a PCMCIA port, a MemoryStick port; a laser printer; a receipt printer (250); a video camera (290); a camera (290); an audio recorder (290); a credit/debit/gift card reader (240); a cash acceptor (230); a coin acceptor; a check acceptor; a jewel case elector (270); a phone docking station; speakers; a Braille input device; a bubble sheet/multiple choice form scanner (such as a Scantron machine); a system or device monitor; device sensors, including speed, vibration, temperature, wetness, voltage, humidity, and photo sensors; Bluetooth communications; Wi-Fi communications; and others known in the art. Furthermore, any additional input, output, and storage technologies known in the art may be integrated with the kiosk 20 (end therefore the system 5).

The kiosk 20 can also include a controlling device that operates the video displays, interacts with input and output devices, and communicates with other kiosks 20 or servers 10, in real-time or as needed. In some aspects, the controlling device may include two or more computers, either sharing or dedicated to the needed tasks requisite to controlling operation. In some aspects, one computer may handle the display, selection, and processing of content purchase transactions and a second computer may handle the display of advertising messages.

The system also contains at least one monitoring agent. The monitoring agent may be located anywhere in the system, but is typically contained in either the first device (i.e., the server), the second device (i.e., the kiosk), or both. The monitoring agent monitors and/or allows any information or data associated with the kiosk, any user, and/or that user's activities ("kiosk data") to be observed by and/or communicated to other kiosks, servers, and/or third parties. Kiosk data, among other things, may comprise information associated to the operation of the kiosk and information related to the entered and/or non-entered activities of users. Entered user activities may include, for instance, information the user inputs into the system, i.e., keystrokes, cursor movements, and the like. Additionally, non-entered user activities may include activities such as the user's body movements and expressions that the user does not input, but that are captured or observed by the kiosk.

To operate, the monitoring agent may use any conventional means for monitoring, including monitoring software and hardware. Some examples of monitoring software include RealtimeSpy, SpeedFan, SpyAgent, NetVizor, GoverLAN, Windows Remote Desktop, Marcel Bresink Software-Systeme's Hardware Monitor Remote, SpectorSoft's Spector Pro, and combinations thereof. Some examples of monitoring hardware that can be used include video cameras (290); cameras (290); audio recorders (290); peripheral add-on monitoring boards; sensors that detect temperature and/or speed (of fans, hard disks, etc.), serial port input/output, vibration, wetness, voltage, and humidity; monitoring chips such as LM8X and LM7X made by National Semiconductor; independent monitoring devices, driverless device nodes that present a message to the operating system of a computer through a device node port and then determines system status by measuring response time; and/or operational stability. Other examples are described in U.S. Pat. No. 6,895,285.

The monitoring agent(s) may be included in the system 5 in any way that allows the monitoring agent(s) to perform the desired monitoring. For example, the first computer of a controlling device could be equipped with a monitoring agent that monitors the first computer as well as a second computer. In turn, the second computer could also have a monitoring agent that acts as a redundant monitor on the controlling device. In another example, several kiosks of the system could be equipped with monitoring agents, and could thereby monitor or allow third parties to monitor information from those kiosks and other kiosks in the system. In yet another example, a server in the system could include a monitoring agent that monitors, or allows a third party to monitor, the kiosk data from all of the kiosks in the system.

A monitoring agent may function in any manner that allows either an operator of the system or a third party to perform the desired monitoring. For example, a monitoring agent may gather and relay kiosk data by running continuous built-in tests ("CBIT") and transparently monitoring for errors without disabling a device or ending software applications. In another example, a monitoring agent may interrupt or shut down a device or various components of the system, including the remote device, and run initiated built-in tests ("IBIT") to search for errors or isolate faults. In yet another example, a monitoring agent may gather information or allow a third party to monitor a kiosk 20 by taking screen shots, interrogating the system and subsystems, and receiving information from sensors, the CPU, input and output devices, and/or the like.

In some embodiments, the monitoring agent(s) may be incorporated into the device/system that it monitors, as known in the art. In other embodiments, the monitoring agent (s) may be electronically connected to, but operate independent of, the device/system it monitors. In this manner, a monitoring agent can still function appropriately even when the device/system it monitors does not. For example, in these other embodiments, a monitoring agent may be unaffected by failure of the CPU, motherboard, power supply, host software, physical room power, network of the monitored device, or any other operating components of the device/system that are being monitored.

In some embodiments, the monitoring agent(s) can function independently by receiving power from a source separate from the device/system it monitors. Any conventional power source could be used as the separate power source. Some examples of separate power sources include an uninterruptible power supply ("UPS"), a battery, a generator, and a separate conventional wall socket. For example, a peripheral add-on board that functions as a monitoring agent may be connected to a rechargeable battery and can continue monitoring and transferring kiosk data once a kiosk has lost power in a power outage. In another example, the first computer of a controlling device comprising two computers could receive its power from a socket and not from the second computer to which it is electronically connected. In this way, the first computer may still monitor the second computer and transfer information (as described herein) when the second computer experiences technical difficulties.

In some embodiments, a monitoring agent may include one or more communication devices that connect the monitoring agent with any desired component of the device it is monitoring, i.e., the remote device. In this way, the monitoring agent may monitor and communicate with any component of the remote device. The communication device of a monitoring agent may also work with an external communications device to facilitate communication with devices—whether internal or external to the system—other than the device being monitored, e.g., service centers, third parties in remote locations, and the like. Any known communications device(s) known in the art may be used, including serial BIOS, serial consoles, video console serializers, input/output interfaces, Ethernet, frame relay, DSL, satellite uplink, cable modem, analog modem, fibre channel, infrared and microwave transmissions, telephone, wireless communications of various types, Bluetooth, Wi-Fi, and/or other networking technologies known in the art.

In some embodiments, the communications device of a monitoring agent may be separate and additional to any other communication device that may be incorporated into the device being monitored (i.e., the kiosk 20). In such instances, the monitoring agent may still monitor a kiosk 20 and communicate externally when the kiosk 20 and/or its communication device malfunction. For example, a monitoring agent may continue monitoring the computer of a controlling device and sending information to a service center when the computer and its communications device are "frozen."

In some embodiments, a monitoring agent can contain any known apparatus for processing and storing the kiosk data that it collects. For example, monitoring software running on a computer of the kiosk's controlling device could use the CPU of the computer to process and analyze kiosk data and then save that data on the computer's hard drive. In another example, the monitoring agent may itself comprise a storage medium to store electronic information and a microprocessor to process such information. An example of these embodiments may be found in an add-on monitoring board equipped with these components.

Figure 3:
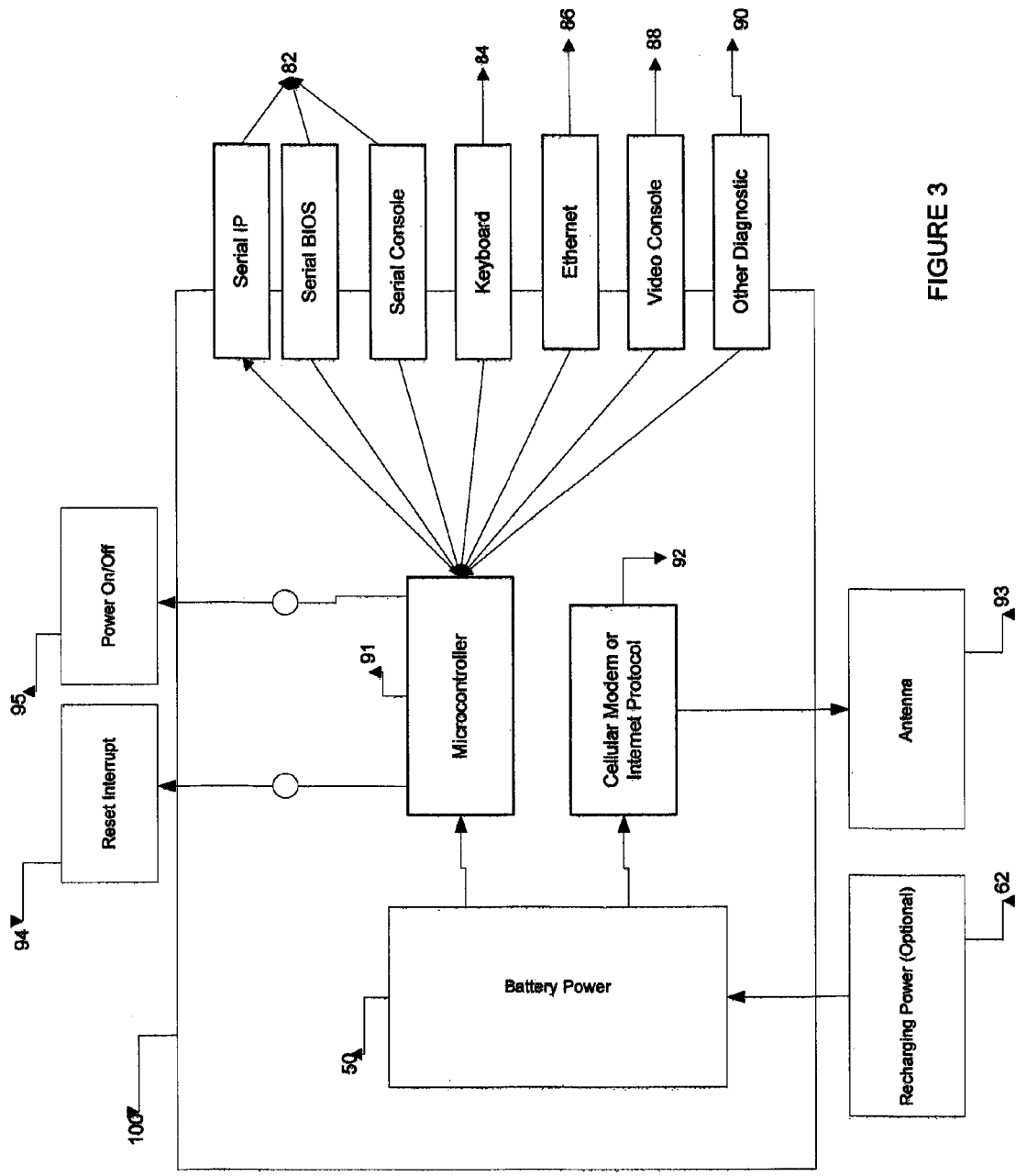
FIG. 3 depicts one example of monitoring agent.

FIG. 3 depicts one example of a monitoring agent 100 that can be used. As shown, the monitoring agent 100 may have a microprocessor 91 that may be electronically connected to the device or system it monitors through any known connection, such as serial IP, serial BIOS, and/or serial console 82. Further, the microprocessor 91 may be connected to the other input/output devices, such as the keyboard 84, a video console 88, and devices where it can run diagnostic tests. The microprocessor 91 may also be connected to the Ethernet and thereby can monitor other devices on the network. The monitoring agent 100 may receive power from a battery 50 and use a cellular modem or internet protocol 92 as the communications center. Examples of other monitoring agents are described in U.S. Pat. No. 6,651,190.

FIG. 2 illustrates one example of kiosk 20 with two monitoring agents, both hardware and/or software. In FIG. 2, a kiosk 20 contains a video display 210 on which advertising messages are displayed; a video display 220 comprising a touch screen device through which a user may view and select content; a cash acceptor 230 through which a user may make payment for content; a credit card reader 240 through which a user may make payment for content; a receipt printer 250 that dispenses a paper receipt of a transaction when content is purchased; a CD burner ejector 260 that dispenses an audio CD containing content selected by a user during a purchase transaction; a jewel case ejector 270 that dispenses an empty jewel case for holding an audio CD; and a USB socket 280 to which a user may connect a device for delivery of content, as described herein. As noted previously, a kiosk 20 may contain different—or additional—components than those shown in FIG. 2. The various components of the kiosk 20 may be electronically connected to a first computer 190 and a second computer 200 of a controlling device. FIG. 2 illustrates that the first computer 190 is equipped with monitoring software 99 that can monitor the first computer 190, the various components of the kiosk 20, and the second computer 200. The second computer 200 is electronically connected to an independent monitoring device 100 that allows it to monitor the second computer 200, the first computer 190, and other components of the kiosk 20.

When a user purchases content 16 through a kiosk 20, that content may be made available using any delivery device known in the art. Some examples of delivery devices can include: audio CD, DVD or similar video or data disc, writeable data CD such as WORM or CD-RAM, magnetic and solid state storage devices that communicate with a kiosk 20 via any means known in the art, and hard-copy paper. In some aspects, the content can be placed on a delivery device that can include plug-ins or software that has advertising integrated and can be used to play the content received.

Other components of a remote device (i.e., a kiosk 20) and/or the system, like the monitoring agent, can be electronically connected to any other component of the remote device, system, and/or third party. Thus, information may be communicated between the various components of the remote devices and system. Again, any known apparatus may be used for this electronic connection, including those previously mentioned. And these electronic connections may or may not include the communications device(s) used by the monitoring agent.

The various components of the system are able to communicate with each other whenever needed. For example, the server 10 and a kiosk 20 may communicate at regular or scheduled intervals, in real-time, or in an ad hoc manner according to needs that arise as determined by the server 10 or the kiosk 20. Since actual real-time communication may be limited by the transmission speeds available, the communication may be on a substantial or near real-time basis.

In some aspects, the various components of the system need not be electronically connected. For example, the kiosk 20 need not be connected to the server 10 on a continuous basis. Rather, the kiosk may operate in a stand-alone mode, with content being transferred to the kiosk 20 via non-networked means, and kiosk data being collected and monitored via non-networked, intermittent means. A stand-alone kiosk 20 can be used, for example, when security procedures or network connectivity are not available, such as a kiosk 20 located on a military base in a different country than the server 10 from which it would otherwise receive content.

The devices and systems described above can be used to carry out several methods. One such method includes transferring the digital content from the first device (i.e., server) to the second device (i.e., kiosk), where it then can be optionally distributed to a user. While the digital content 16 can be transferred in any manner, in some aspects it can be transferred in a semi-dynamic manner as described in U.S. patent application Ser. No. 11/397,292.

At any point in this transfer method, the content can be customized. When the content is transferred from the server to the kiosk, the operator of a server 10 may customize which content (or category, group of content, or advertising) is transferred, as well as customize which content is transferred from a server 10 to a particular kiosk 20 (or to a collection of multiple kiosks 14). As well, the content can be customized by a content provider 30 or location partner 40 before it is distributed to a user. Some examples of the content selection parameters include a location partner 40 who owns a venue catering to children who may indicate that only music having no profanity in lyrics and only movies having a rating of G or PG are to be offered for sale; and a location partner 40 that may also indicate that only country music and movies having either Clint Eastwood or John Wayne are to be offered for sale. Another example of such parameters include a location partner 40 who sell sports equipment specifying that any advertising has a sports theme.

Figure 4:
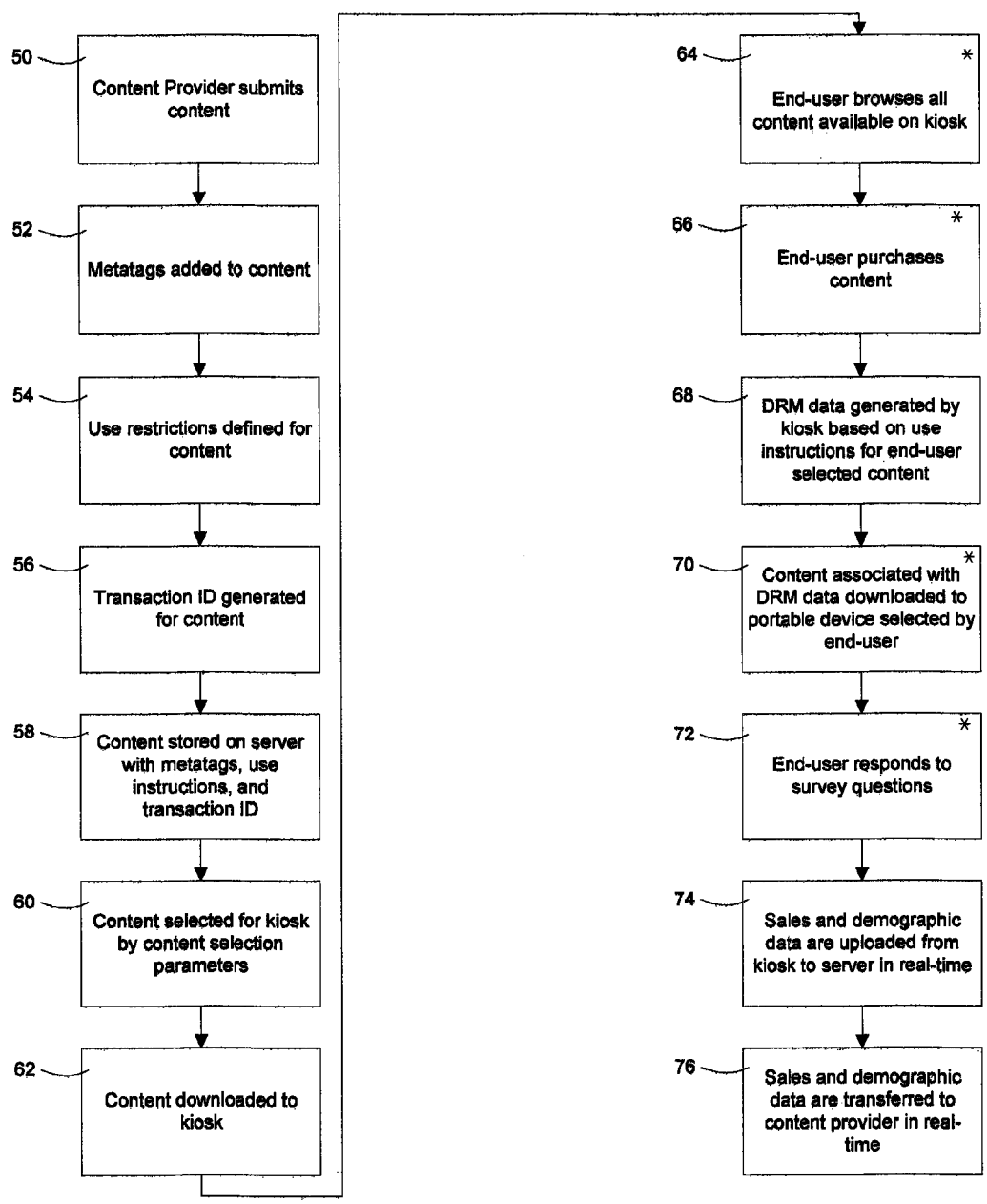
FIG. 4 illustrates some activities that are part of one method for delivering digital content at a remote location.

One example of a method of transferring the digital content is illustrated in FIG. 4. In this Figure, the content can be provided, either by the operator of the system or by a content provider (as shown at 50). If desired, metadata can then be added to the content (as shown at 52). Next, both use restriction(s) and a transaction ID(s) can be generated for the digital content if needed (as shown at 54 and 56). When they are used, the metdata, use retriction(s), and transaction ID(s) can be added to the digital content (as shown at 58). The content that has been selected for transfer (as shown at 60) can then be transferred to the remote device (as shown at 62).

Another method of using the system includes the process of distributing the content to the user. As noted above, the second device of the system can be used to distribute the digital content to a user. For the system 5 illustrated in FIG. 1, the kiosk 20 can distribute the content to any desired user. The user can access the kiosk at any location where the kiosk is located. The kiosk 20 may be placed in any public (or private) location where members of the public will be drawn to it. A kiosk 20 owned or controlled by one entity may also be placed in a location designated by a location partner 40 that owns or controls the location of placement.

Typically, the content can be transferred to any portable electronic device operated by the user that is capable of storing and/or using the content. In some aspects, the portable device comprises a portable storage device or portable viewer/player. The portable storage device may comprise a USB-based solid state storage device, such as a flash-drive, thumb-drive, keychain drive, or similar device; or other portable storage devices, including Compact Flash cards, Secure Digital cards, Memory Stick cards, or other similar technologies. A portable storage device may also comprise magnetic or optical storage technologies as known in the art, including CDs and DVDs. The portable viewer/player may comprise a portable music player (such as an iPod or similar player) or a portable electronic document viewing device (such as an e-book reader), a mobile or cellular telephone, a personal digital assistant (such as a Palm Pilot, iPaq, Blackberry device), or similar devices using any technology, operating system, or configuration known in the art. The transfer to the portable device can be made using any technologies known in the art. These technologies include wireless transfers (i.e., Blootooth, Wi-Fi, etc.), network transfers via any protocol, and bus transfers between devices attached to the same computer processing unit via connectivity such as USB port, FireWire IEEE-1394, serial port, parallel port, PCMCIA, CompactFlash, SecureDigital, or like ports or means of electronic connectivity.

Another method of using the system described above includes a method of interacting with the remote device. The user can interact with the kiosk 20 in any desired manner, whether or not any content is actually distributed. Typically, the interaction proceeds in the manner depicted in FIG. 4, although many variations are possible and the illustrated procedure need not be followed sequentially. At 64 in FIG. 4, the user can optionally view advertising on the first video screen and optionally begin to use an input device located on or adjacent to the kiosk to navigate among a collection of content that is available for review or sale via the kiosk. Next at 66, the user may optionally experience samples of content via the first or second video screen or another output device located on or adjacent to the kiosk. In one example, a user can listen to the first 30 seconds of a music file that is available for purchase via the kiosk. The user can then select content to be acquired, typically by paying a purchase price, and entering payment information as appropriate to the transaction, such as a credit card number or other account number through which a payment may be collected. This information can then be verified in real-time.

At 68 in FIG. 4, the method continues when DRM restrictions and license information are calculated as needed based on the use instructions associated with the content that was selected for purchase. The kiosk 20 can use multiple factors to generate customized DRM and licensing information that is included in the content 16 that is transferred to the delivery device. Next, as shown at 70, the user can select the portable device onto which the content 16 will be placed for use and/or storage by the user and the content 16 is delivered to the selected delivery device including the calculated DRM/license information that is derived from a) the use instructions provided by the content provider that provided that content; b) the default settings selected by the operator of the server; and c) the delivery device selected by the user.

After the requested content has been transferred to the portable device, the user may use the content as he or she chooses, within the limits of the DRM restrictions that were part of the content transferred to the delivery device. As an example, a user who purchased a digital music file and downloaded that file to a solid state storage device using a USB interface (the delivery device in this example) might be permitted to copy the music file three times, such as from the delivery device to a desktop computer, from the desktop computer to an audio CD, and from the desktop computer to a portable music player device. After these three copying operations, the music file could not be copied to any other device, though it could be played from any of the four devices on which it existed (the original delivery device, the desktop computer, the audio CD, and the portable music player device).

As depicted at 72 in FIG. 4, the user can then answer questions or in other ways reveals demographic, poll/voting, or personal data (collectively, "survey data"). This step is optionally completed while payment information is being authenticated, while content is being downloaded in substantial real-time, and while content is transferred from the kiosk to the selected delivery device.

After the purchase at 74, the kiosk 20 may optionally print a receipt during or after a purchase. This receipt constitutes a transaction record and may optionally include coupons, discount codes, printed advertising material, or similar promotional items. Such promotional items may optionally be selected based upon the browsing activities of the user, upon items purchased, or upon related factors, analyzed singly or in combination.

Figure 5:
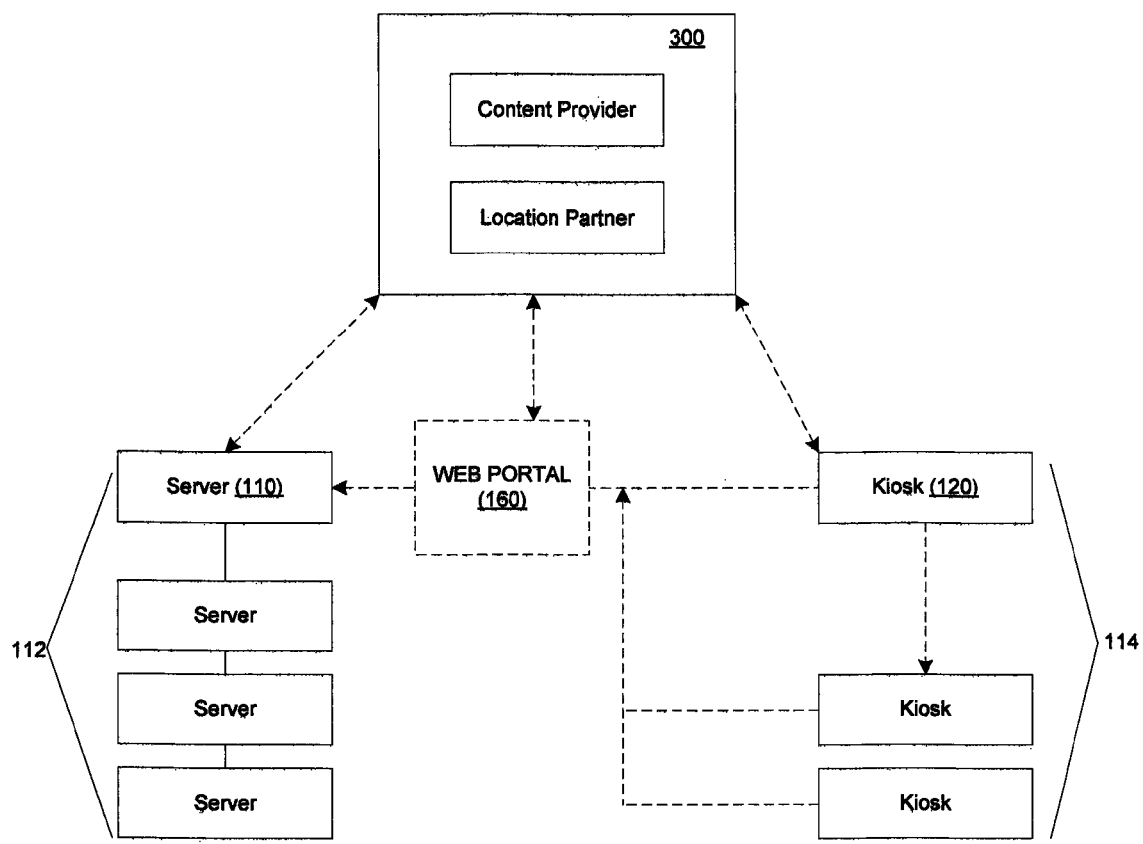
FIG. 5 illustrates some components in a system that can be used in delivering digital content.

In addition to transferring digital content to the remote device, the system can be used to transfer data from the remote device to the central device using any method, including the method illustrated in FIG. 5. Any information can be transferred from the remote device (i.e., kiosk 120 or kiosk cluster 114) to the central device (i.e., server 110 or server cluster 112). Such information includes the kiosk data that can be monitored and collected by a monitoring agent, as discussed above.

One such type of kiosk data comprises fault monitoring data ("fault data"). This data can include panic, alarm, error, troubleshooting, diagnostic, status, latency, and system fault messages/codes from the software, utilities, drivers, operating system, motherboard, daughterboard, CPU, and other hardware, including the previously mentioned input/output, communications, sensors, and network devices. Fault data may also entail fan speeds, component temperatures, vibration measurements, humidity readings, power levels, wetness measurements, light measurements, and such other diagnostic information Another type of kiosk data that can be transferred from the remote device to the central device comprises system performance data ("performance data"). Such data may include information about usage, space, and size of the remote device's memory, including random-access memory ("RAM"), read-only memory ("ROM"), programmable read-only memory ("PROM"), erasable programmable read-only memory ("EPROM"), electrically erasable programmable read-only memory ("EEPROM"), basic input/output data ("BIOS"), cache, solid state memory devices, magnetic hard disks, removable magnetic disks, and the like. Performance data may also include CPU and bandwidth usage, data transfer speeds, average wait times, pages printed per minute, duration of transactions, and combinations thereof.

Another type of kiosk data that can be transferred includes the non-entered physical activity of a user during an interaction with the remote device ("physical activity data"), obtained for example from recording device (290). Such data includes, for example, video footage capturing a user's body movements, positioning, and expressions during an interaction; audio recordings of a user's verbalizations/noises; biometric data, such as fingerprints, voiceprints, hand geometries, retinal/iris scans, signature verifications, facial recognitions, and combinations thereof.

Another example of kiosk data that can be transferred comprises data relating to the user interface ("graphical data") of a remote device. This graphical data includes anything displayed on any video display of a remote device. For example, this data may include content viewed or selected, time spent viewing content/ads, content purchased, keystrokes, cursor movement, touchscreen activities, including but not limited to items selected, touch movements, and so forth. By watching or receiving this data, the operator of the system or a third party can monitor the remote device as if present at the remote location.

Another example of kiosk data that can be transferred includes conversion data, such as pages viewed, content format, images viewed, color schemes viewed, time of viewing, time of viewing in relation to purchase, content 16 or item(s) purchased/downloaded/selected, requests made, demos/games played, registrations, signups, advertisements viewed, items added or removed, and so forth.

Another example of kiosk data includes user demographic data, such as age, sex, ethnicity, race, marital status, household size, schooling/education, income, profession, languages spoken, citizenship, and the like. Another example of kiosk data includes survey data, such as consumer satisfaction surveys, event expectation surveys, post-event evaluation surveys, polling/voting data, etc. Another example includes user preference data, such as user selected color schemes, content preferences, advertisement preferences, e-mail preferences, and the like. Another example of kiosk data includes user indicated items of interest, such as forms and genres of entertainment and hobbies. Another example includes user account information, such as username, password, address, phone number, e-mail address, unique login identifiers, cookies, user specific survey/conversion data, etc.

Yet another type of kiosk data relates to the kiosk demographic data at the location of the remote device, i.e., print/design advertising or products associated with remote device, kiosk location, seismic/meteorological activity, local advertisements, artist's music, local event calendaring, and so forth. Yet another type of kiosk data includes sales/transaction data such as the content sold, content price, promotional codes entered, royalty information, license numbers, inventory ID numbers, transactional IDs, time of sales, purchases contemplated or completed by the user, nature of delivery device, credit/debit/gift card information, promotional/discount codes, accounting information, and so forth. Other information that may or may not fall within these categories can include purchase transaction data, the advertising content displayed immediately prior to the user's interaction with the kiosk, and the nature of the delivery device selected by the user.

Before any kiosk data can be transmitted to the central device, it may be collected and gathered at the remote device. Any device or apparatus that can collect and gather such data can be used. Although examples of such devices include data gathering devices like the controlling device and hand-held units, in some embodiments, monitoring agents may also gather all of this data.

The collected data can then be transferred from the monitoring agent or other collecting device/apparatus to the central device. The data can be transferred on a periodic basis, on a semi-dynamic basis, or on a real-time basis. Because perfect real-time basis may not be available due to data transmission speeds, the transfer can be on a near (or substantial) real-time basis. In other words, due to the delay caused by data transmission, processing, and analysis, real-time communications are often referred to in the art as near real-time, though they are often used interchangeably. In some aspects, the data is transferred as close to a real-time basis as allowed under the operating conditions then existing because this allows for the immediate aggregation and dissemination of data from the central device.

The collected data may also be communicated to or monitored by content providers or other third parties using a variety of techniques. In one technique, the entity controlling the server actively communicates to one or more content providers or other third parties using, for example, e-mail, EDI, DEX/UCS, or uploading of data to a separate computer controlled by the content provider or other third party. In a second technique, a content provider or other third party is provided with access to the server on which kiosk data is stored, or another server controlled by the same or an affiliated entity. This technique permits the content provider or other third party to access and monitor kiosk data, including analyses and reports, in real-time or at times determined by the content provider or the other third party. One example of a communication method by which a content provider or other third party may access and monitor kiosk data on a server 110 is via a web portal 160 provided by the entity that controls the server 110. This web portal is provided in one exemplary embodiment by the same web server that provides a web page embodiment of a kiosk 120, with the server 110 providing appropriate information to content providers 300 and to users based on login location, authentication information provided, and other criteria as is standard in the art.

Other examples of communication methods by which a content provider or a third party may monitor, receive reports concerning, or otherwise access kiosk data are automatic facsimiles, phone calls, pages, instant messages sent by means such as Google Talk, Skype, or Windows Messenger, or reports delivered by the system when the content provider or third party calls. One example of a communication method where a content provider, system operator, or other third party can monitor the system and receive automatic reports is where the system phones a system operator to alert the operator of an inventory shortage. Another technique that allows content providers or third parties to access and monitor kiosk data is by allowing access to information directly from the kiosk. In this technique, a content provider or a third party may access, monitor, or receive kiosk data by entering login location, authentication information provided, and other criteria as known in the art via a touch screen or other input device, or by networking with the kiosk using a handheld connection machine such as a pocket-probe. Once entered, the third party may monitor kiosk data according the parameters specified by the system operator.

Once available, the data (including the kiosk data) can then be monitored by or reported to third parties, including copyright owners. If content providers, copyright owners, or others are due royalties or other payments based on use or sale of content, such royalties or other payments may be made from the operator to the appropriate recipient using automated means as known in the art. A system operator can also authorize any third party to access, monitor, or receive reports, and restrict the information that the third party can access.

The collected data (including the kiosk data) can be reported to or monitored by the third parties by either transmitting it to the third parties or by allowing the third parties to access the central device either directly or indirectly through the web portal. In the former situation, the collected data may be optionally collated, analyzed, summarized, or otherwise processed using a variety of steps. This situation allows the operator of the system to perform the analysis, filter the results, and/or customize the report that is sent to the third party. In the latter situation, the third party can monitor the collected data before (or as) it is received from the remote devices or anytime during the analysis, filtering, or customization process. Of course, access to the central device by the third party can be established using any parameters desired by the operator of the system, i.e., access to only certain portions of the collected data.

Alternatively, the collected data (including the kiosk data) need not be transmitted to the central device before being monitored by or reported to third parties. In these aspects of the systems, the kiosk data can be monitored by either transmitting it to the third parties 300 from the remote device(s) (i.e., kiosk 120) or by allowing the third parties to access the remote device(s). Both of these situations give the third party more access to the raw data that has been collected, but does not necessarily allow the operator of the system to analyze, filter, or customize the report. Of course, access to the kiosk(s) by the third party can be established using any parameters desired by the operator of the system, i.e., access to only certain portions of the collected data.

In certain instances, the collected data (including the kiosk data) can be sent to kiosks other those than where that data originated (i.e., secondary kiosks). Such a situation can be advantageous when a location partner or third party wants to access and/or monitor kiosk data from a group of kiosks in the same location or vicinity. In these aspects, the data can be transmitted to or from the secondary remote device, allowing the third parties to access and/or monitor the data for the plurality of remote device(s). This situation gives the third party more access to the raw data that has been collected, but does not necessarily allow the viewer of the system to analyze, filter, or customize the report. Of course, access to the kiosk(s) by the third party can be established using any parameters desired by the operator of the system, i.e., access to only certain portions of the collected data.

In other instances, the collected data (including the kiosk data) can be physically accessed and monitored by a third party 300 in the vicinity of the remote device. In such situations, the third party is often a location partner who monitors the collected data to analyze conversion and sales data. These configurations also allow the third party to be immediately alerted to the information gathered. For example, a third party at a remote location may operate a music store. After posting music from a featured artist, and a survey concerning event expectation for the artist's upcoming concert, the third party can monitor survey results in real-time in order to better plan for event attendance.

All of this collected data (including the kiosk data) from the remote device(s) can be used for numerous purposes. In some aspects, the various types of kiosk data may be used to improve customer relationship management, as known in the art, and thereby maintain and create lasting relationships with users. The ability to monitor user transactions allows determination of common trouble spots in the user interaction with the system, including interactions with the remote device. With this information, the system can remove or change the trouble spots and make the system and remote devices more user friendly. Also, by receiving and being able to monitor large amounts of detailed feedback from earlier analysis, the system may be better equipped to make decisions that reflect the wants and needs of users.

In other aspects, the collected data can be part of the general and specific market research data that can be used by the system as known in the art. With the market research data, the system can monitor, access, and immediately analyze customer, product, and sales trends. These sales trends can even be narrowed down to the sales trend of specific users. For example, the system could use stored user personal details and activities to create predictive modeling of the user's attributes and future activities.

In some aspects, the collected data can be used to enhance and/or customize the operation of the system. For example, a system administrator could monitor fault and performance data to identify factors that slow transactions. For instance, if a system administrator, in a remote location, determined that the software of a kiosk 20 needed more RAM than the device could provide, the system administrator could visit the kiosk 20 to shutdown some programs or add more RAM to speed the system.

In some aspects, the collected data can be used to enhance the transfer of the digital content. For example, the server 20 can track what content and advertising messages are available at one or more kiosks 20 so as to enable the server 10 to efficiently determine what content or advertising messages to provide to each kiosk 20 during data transfers, and also to permit the server 10 to report to other kiosks 20, to content providers 30, to location partners 40, or to other authorized third parties the locations of specific content or aggregate or statistical data derived therefrom.

In yet other aspects, the collected data can be used to customize the content. Such a customization may be based upon factors such as statistics showing which content is most popular or most purchased at a given kiosk, survey data, customer browsing activity, customer profile, customer selected preferences, demographic data, price point of content, the requirements or requests of the owners of venues in which a kiosk is located (location partner 40 as shown in FIG. 1), or territorial requirements (such as state law regarding explicit content). For example, the graphical and conversion data can be used to customize the content delivered in near real-time or used in the aggregate to predict the types/genre of media that is popular in a given locale. Alternatively, the collected data can be used to customize the digital content by day part, location, and audience.

In other embodiments, the collected data (including the kiosk data) can be used to customize the advertising. In these embodiments, the customized advertising can be better targeted for viewer/user needs and desires and allow for advertising to broad general audiences or even niche markets and individual users. The advertising may include messages used to market, promote, or sell products or services or to enhance brand recognition, as well as training materials, entertainment content, community or location information, and other similar materials. In other aspects, the advertising may include video clips, audio clips, ring tones, printed coupons, promotional codes, brochures, literature, images, giveaways, discounts associated with digital content or other promotional or brand-related content. In some embodiments, advertising may be presented through video and/or audio presentations, animated PowerPoint presentations, flash programs, banners, pop-ups, screen-savers, wallpapers, posters, digital sampling, cost-per-pixel, cost-per-click, advertisement images, printed advertisements, trademarks, and other similar advertisements. One example of the advertising includes the promotion of artists or performers, whose products or content are available for sale on the kiosk.

The systems and methods described above can be varied and/or modified. In one variation, a user can interact with a kiosk 20 to select and purchase content, but selects a delivery device that is not co-located with the kiosk 20 at which the original interaction and purchase occurred (the "delivery location"). As one example, an user could interact with a server using a web page embodiment of a kiosk 20, then select a separate kiosk 20 having a CD-burning output device as the delivery location. As a second example, a user could interact with a server 10 via a first kiosk 20 having two video displays and a CD burner, but then discover that the user's preferred delivery device, an audio CD, was unavailable because all blank audio CDs at that particular kiosk 20 have been used. In this scenario, a monitoring agent could notify the operator of the audio-CD shortage, in real-time, and send dispatch to replenish the kiosk's supplies. Meanwhile, the user could then select as the delivery location a kiosk 20 located in another building on the same campus where blank audio-CDs were available; or the user could select a web page embodiment as the delivery location and a download to hard disk as the delivery device.

Figure 6:
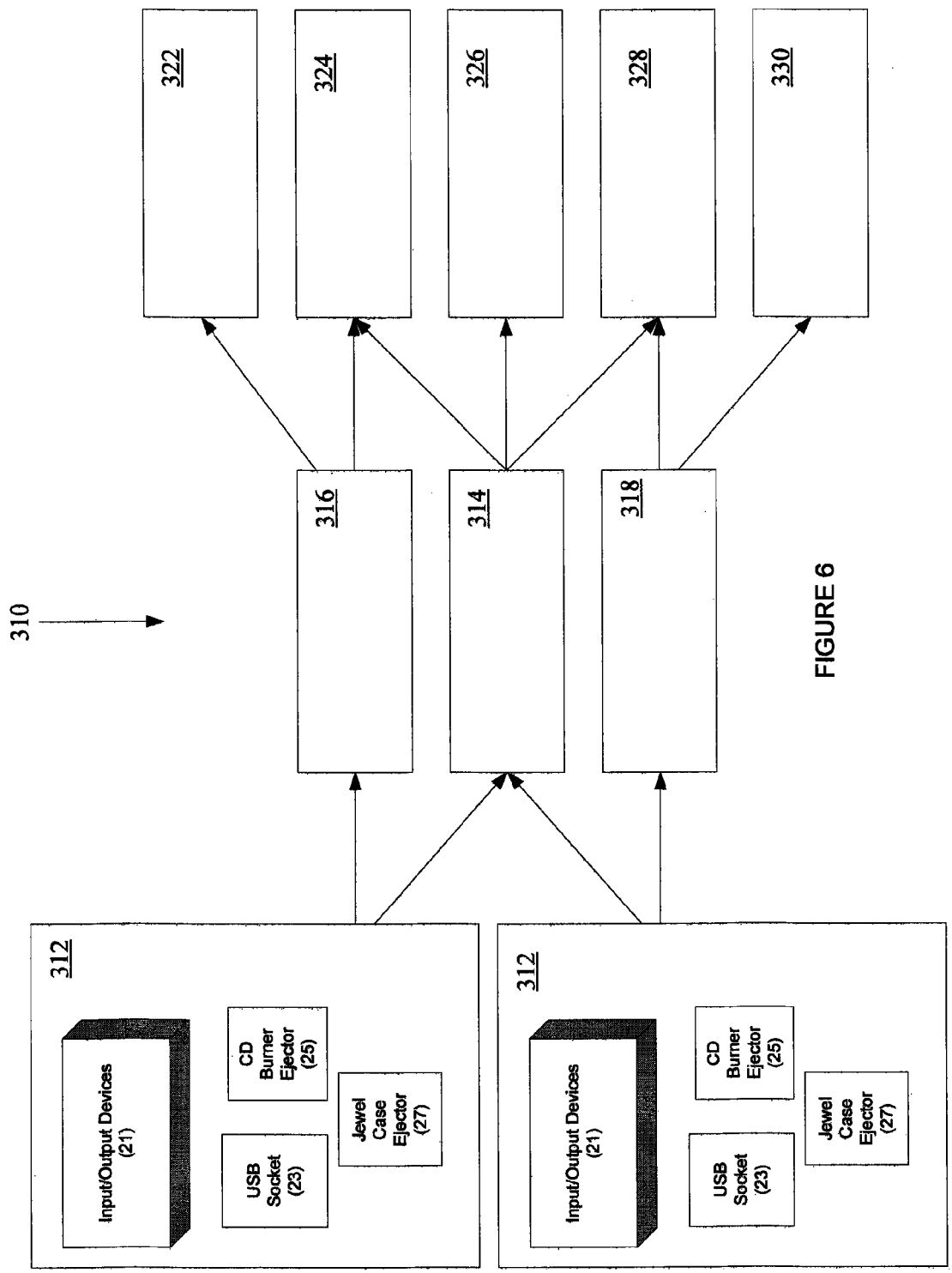
FIG. 6 depicts some components in a system that can be used in delivering digital content.

In other variations, the system contains the second device and a third device as illustrated in FIG. 6. As shown in FIG. 6, the system 310 contains one or more second devices (i.e., kiosks 312) that can be used to distribute digital content onto any number of third devices. Examples of the second devices include a magnetic or optical storage device 314 (like a CD or DVD), a portable storage device (like a USB flash drive) 316, neither of which can use the digital content. Another example of the third device is a portable device 318 that can use/play the digital content (like an iPod or an e-book reader) as well as store the content.

The selected digital content (along with the associated information) can be transferred from the second device to the third device. For the storage device 314, the user receives the user receives the magnetic or optical storage device 314 containing the digital content from a corresponding receptacle in the kiosk, i.e., CD/DVD burner ejector 25. Optionally, a jewel case (or any other type of enclosure) for the storage device 314 can be received from the kiosk. And for the portable storage device 316 and/or the portable device 318, the digital content is transferred form the kiosk 312 using any electronic connection, such as USB socket 23. The kiosk 312 can record the selected content with the associated information and record it onto these devices 314 during the transfer process.

Thus, in some instances the user can use the third device to immediately access/use that digital content, i.e., read a digital copy of a book. In other instances, though, the third device merely stores the digital content and it must transfer the digital content to a fourth device that is capable of using/accessing the digital content. Examples of the fourth device include a personal computer 322 or a component of a personal computer, a server (or server cluster) 324, an audio system 326 such as home entertainment center, a video system 328 such as a digital video recorder, or digital video player 330. Of course, the fourth device itself can also be a portable storage device that it turns accesses/uses the digital content or merely stores it to transfer to a fifth device (that can be any of the disclosed above).

In another variation, the entity that operates a server 10 or kiosk 20 may receive a fee or services in exchange for presenting a question as part of a survey conducted at a kiosk 20. In some aspects, such a question would be presented only to members of specific demographic groups as requested by the entity paying a fee or services to obtain responses to a question. The survey results could then be monitored by the entity that operates a server 10 or kiosk or by a third party in real-time.

In yet another variation, a user may establish a user account without using the kiosk 20, i.e., via a web page that is linked the system. Such a user account may require that a user pay a fee or may be offered without charge. Such a user account permits the user to receive marketing and promotional materials—including, as examples, promotional codes, coupons, user specific advertisements determined by user preference settings or demographic data, and notices of forthcoming content and events related to content, such as concert dates, book signings, and so forth—via e-mail or other communications methods. Such a user account also permits a server 10 to monitor and track with more precision the activity of the user across multiple kiosks 20, browsing sessions, and purchase transactions. The data collected can then be monitored by a content provider 30 or a third party at a remote location in real-time.

By using this web page technique, a content provider 30 may be enabled to encompass multiple activities related to exemplary embodiments through a single connection or interface. For example, a content provider 30 may use a web page provided by the operator of a server 10 in order to complete any of the following activities: upload content to a server 10; indicate use instructions for content, either for specific pieces of content or by category or parameters describing multiple pieces of content; upload advertising content to a server 10; make recommendations to the operator of a server 10 as to preferred advertising content to be associated with content provided by that content provider 30; monitor or download kiosk data related to content provided by that content provider 30; view or download aggregate kiosk data with statistics related thereto for content provided by multiple content providers 30; monitor or download kiosk data associated with purchase, viewing, or use of content provided by that content provider 30; monitor or download aggregated kiosk data or statistics related thereto associated with purchase, viewing, or use of content provided by multiple content providers 30; configure preferences related to that content provider's upload, download, viewing, or other settings when interacting electronically with a server 10; and control or configure automatic provisions of kiosk data or statistics related thereto to the content provider 30 via e-mail or communications methods known in the art.

In another variation, the first device can comprise a kiosk and the second device can comprise a peripheral that may optionally be located remote from that kiosk. In these variations, the peripheral may also be equipped with a monitoring agent(s) and thereby monitor itself, other peripherals, and even the kiosk.

In even another variation, a monitoring agent can comprise notification means. In these variations, the monitoring agent may cause a light, noise, or other signal to be emitted for any needed purpose, i.e., in order to notify a third party in close proximity that the device is malfunctioning.

In still another variation, multiple kiosks 14 may be linked in a manner such that purchases are completed on one or more kiosks 20, but the delivery location for all such purchases is a designated delivery device located on a specific kiosk 20. As one example, a retail establishment could maintain multiple kiosks 14 at which customers could browse available content. After purchase of content through any of those multiple kiosks 14, all users would collect an audio CD, DVD, video disk, or other delivery device from a separate kiosk 20 that was designed for high-volume generation of such delivery devices.

In addition to any previously indicated variations, numerous other modifications and alternative arrangements may be devised by those skilled in the art without departing from the spirit and scope of the invention and appended claims are intended to cover such modifications and arrangements. Thus, while the invention has been described above with particularity and detail in connection with what is presently deemed to be the most practical and preferred aspects of the invention, it will be apparent to those of ordinary skill in the art that numerous modifications, including but not limited to, form, function, manner of operation and use may be made without departing from the principles and concepts set forth herein.

We claim:

1. A distribution device for distributing digital content to a user, the distribution device comprising:
   a plurality of input devices, where the plurality of input devices are configured for entering information into the distribution device;
   one or more recording devices for observing body movements of the user physically present at the distribution device;
   a monitoring agent for collecting monitored data, the monitored data comprising information about the plurality of input devices and information about the body movements of the user observed by the one or more recording input devices; and
   the distribution device configured to provide customized digital content based on the monitored data;
   wherein the distribution device is configured to display custom content selected at least in part by a location partner; and wherein the communication device is configured to communicate the monitored data to the location partner.

2. The distribution device of claim 1, wherein the plurality of input devices comprises two or more from the group consisting of: a keyboard, a mouse, a touch screen, an image scanner, a barcode scanner, a biometrics scanning device, and a media device connection.

3. The distribution device of claim 2, wherein the plurality of input devices comprises at least a keyboard and a mouse, and wherein the monitoring agent monitors a user's keystrokes or cursor movements.

4. The distribution device of claim 1, wherein the one or more recording devices comprises a camera.

5. The distribution device of claim 4, wherein the monitoring agent gathers data about the user's expressions while using the distribution device.

6. The distribution device of claim 1, wherein the monitoring agent comprises a communication device for communicating with a remote location.

7. The distribution device of claim 6, wherein the communication device is configured to communicate the monitored data to the server from which it receives the digital content.

8. The distribution device of claim 6, wherein the communication device is configured to communicate the monitored data to one or more other, remotely located distribution devices.

9. The distribution device of claim 1, further comprising: a plurality of distribution devices located within space provided by the location partner each configured to display custom content selected at least in part by the location partner, and wherein the communication device is configured to communicate the monitored data to one or more other of the distribution devices associated with the location partner.

10. The distribution device of claim 6, wherein the communication device is configured to receive data from the remote location to control operation of the monitoring agent from the remote location.

11. The distribution device of claim 1, wherein the monitoring agent comprises a hardware component, a software component, or both.

12. The distribution device of claim 1, wherein the monitoring agent is further configured to monitor operation of the distribution device.

13. The distribution device of claim 1, wherein the monitoring agent is configured to monitor the user's interacting with the input devices on a substantially real time basis.

14. The distribution device of claim 1, wherein the distribution device comprises a kiosk.

15. The distribution device of claim 1, comprising a first power source for the monitoring agent separate from a second power source for other components of the distribution device to thereby allow the monitoring agent to continue operating even when the second power source fails.

16. A system for distributing digital content to a user comprising:
a distribution device being configured to provide the digital content to a user physically present at the distribution device, the distribution device comprising a plurality of input devices for entering information, the distribution device further comprising one or more recording input devices for observing physical features of the user at the distribution device; and
a monitoring agent for collecting monitored data the monitoring agent configured to have a power supply and communication means independent of the distribution device;
wherein the distribution device is further configured to:
provide customized digital content and advertisements based on the monitored data; and
display custom content selected at least in part by a location partner; and
communicate the monitored data to the location partner.

17. A computerized method for distributing digital content to a user through a distribution device the computerized method comprising:
monitoring operation of the distribution device to provide monitored data, wherein monitoring consists of receiving information from the user through a plurality of input devices associated with the distribution device, capturing a user's physical features through one or more recording devices associated with the distribution device, and tracking kiosk data of the distribution device;
collecting the monitored data using one or more monitoring agents;
communicating the monitored data to a location partner;
customizing the content displayed on the distribution device based on the monitored data, where customizing comprises the location partner selecting at least some of the content that is displayed on the distribution device; and
providing customized digital content based on the monitored data.

18. The method of claim 17, wherein receiving information from the user through a plurality of input devices, comprises monitoring a user's keystrokes on a keyboard, cursor movements of a mouse controlled by the user, or touches on a touchscreen by the user.

19. The method of claim 17, wherein observing physical features of the user at the distribution device through one or more recording devices comprises monitoring the user's body movements or expressions through a camera while the user is using the distribution device.

20. The method of claim 17, further comprising communicating monitored data between the distribution device and a remote location.

21. The method of claim 20, wherein communicating monitored data between the distribution device and a remote location comprises communicating the monitored data to a server, and the server is configured to deliver the customized digital content to the distribution device.

22. The method of claim 20, further comprising communicating the monitored data to one or more other, remotely located distribution devices.

23. The method of claim 17, wherein customizing the content displayed on the distribution device based on the monitored data comprises customizing the content displayed on a plurality of distribution devices by communicating the monitored data from the distribution device to one or more other distribution devices associated with the location partner, and the location partner selecting at least some of the content that is displayed on each of the one or more other distribution devices.

24. The method of claim 20, further comprising controlling operation of the one or more monitoring agents from the remote location.

25. The method of claim 17, wherein tracking kiosk data of the distribution device comprises monitoring at least one of fault data, performance data, management data, graphical interface data, statistical data, and diagnostic data.

* * * * *